(12) United States Patent
Friesenhahn et al.

(10) Patent No.: US 6,644,619 B2
(45) Date of Patent: Nov. 11, 2003

(54) VALVE HOUSING WITH EMBEDDED ELECTRICAL LEADS

(75) Inventors: Waldemar Friesenhahn, Kornwestsheim (DE); Barbu Frunzetti, Kornwestheim (DE); Wolfgang Richter, Kornwestheim (DE)

(73) Assignee: Behr Thermot-Tronik GmbH, Kornwestheim (DE)

( * ) Notice: Subject to any disclaimer, the term of this patent is extended or adjusted under 35 U.S.C. 154(b) by 0 days.

(21) Appl. No.: 10/046,487

(22) Filed: Oct. 26, 2001

(65) Prior Publication Data

US 2002/0070367 A1 Jun. 13, 2002

(30) Foreign Application Priority Data

Nov. 7, 2000 (DE) .......................................... 100 56 076

(51) Int. Cl.$^7$ .............................. F01P 7/16; F16K 31/64
(52) U.S. Cl. ..................................... 251/11; 251/129.01
(58) Field of Search .................. 251/11, 129.01–129.22

(56) References Cited

U.S. PATENT DOCUMENTS

| | | | | |
|---|---|---|---|---|
| 3,866,095 A | * | 2/1975 | Marmorek | 317/230 |
| 4,685,651 A | | 8/1987 | Nouvelle et al. | 251/11 |
| 5,043,791 A | * | 8/1991 | Stokes et al. | 357/70 |
| 5,311,162 A | * | 5/1994 | Sjoquist et al. | 335/260 |
| 5,482,010 A | | 1/1996 | Lemberger et al. | 123/41.1 |
| 5,494,005 A | * | 2/1996 | Saur | 123/41.1 |
| 5,607,324 A | | 3/1997 | Saur et al. | 439/565 |
| 5,678,300 A | | 10/1997 | Saur et al. | 29/611 |
| 5,765,538 A | * | 6/1998 | Krimmer et al. | 123/516 |
| 5,775,270 A | * | 7/1998 | Huemer et al. | 123/41.1 |
| 5,820,099 A | * | 10/1998 | Rahbar et al. | 251/129.15 |
| 5,996,619 A | * | 12/1999 | Saur et al. | 251/118 |

FOREIGN PATENT DOCUMENTS

| | | |
|---|---|---|
| DE | 1 513 803 | 6/1978 |
| DE | 42 33 913 A1 | 4/1994 |
| DE | 44 09 547 C2 | 1/1995 |
| DE | 197 00 722 A1 | 7/1998 |
| EP | 0 732 642 A2 | 9/1996 |
| EP | 0 838 580 A1 | 4/1998 |

OTHER PUBLICATIONS

German Search Report.
Abstract for DE 19700722.

* cited by examiner

Primary Examiner—Paul J. Hirsch
(74) Attorney, Agent, or Firm—Kennedy Covington Lobdell & Hickman, LLP

(57) ABSTRACT

An improved housing for a thermostatic valve has a non-conducting cover that features a projection into the interior of the valve housing. Mounted on the projection is a thermostatic operating element, which operates to control the valve when wax inside the thermostatic operating element is heated. A pair of electrical leads, connectable to an exterior power source, are embedded within the cover, extending through the projection and connecting to a heating element within the thermostatic operating element. When electrical current is applied to the heating element through the embedded electrical leads, the wax is heated, thereby expanding, driving a work piston of the thermostatic operating element, and opening the valve.

19 Claims, 2 Drawing Sheets

VALVE HOUSING WITH EMBEDDED ELECTRICAL LEADS

CROSS-REFERENCES TO RELATED APPLICATIONS

This application claims the benefit of German patent application no. 10056076.8, filed Nov. 7, 2000, herein incorporated by reference.

1. Field of the Invention

The invention relates to an improved housing for a thermostatic valve for a coolant circuit of an internal combustion engine, which housing is formed at least partially of a plastic material, and in which housing electrical connecting leads are embedded.

2. Background of the Invention

In a thermostatic valve for a coolant circuit of an internal combustion engine, it is advantageous to be able to control the operation of the valve other than through the temperature of the coolant flowing through the valve. One means by which the operation of a thermostatic operating element for such a valve may be controlled is by the inclusion of a heating element within the thermostatic operating element, which heating element is controlled electrically from the exterior of the valve.

The desire to maintain electrical control over the heating element presents a substantial conflict between the need to have electrical leads enter into the valve housing and the need to prevent coolant from leaking through the point of entry of the electrical leads. For instance, German Patent Appl. No. DE 42 33 913 A1 teaches a housing for a thermostatic valve for a coolant circuit of an internal combustion engine in which the electrical leads supplying a heating element of a thermostatic operating element within the valve housing run from the heating element to a point outside the valve housing. Specifically, the housing of the thermostatic operating element is mounted on the valve housing and the electrical leads are embedded in a plastic casing of the housing of the thermostatic operating element. The electrical leads are directed through a conduit within a crosspiece of the valve housing, upon which crosspiece the thermostatic operating element is supported, and to the exterior of the valve housing. Because coolant flows within the valve housing, around the thermostatic operating element and the crosspiece on which it is supported, this configuration necessitates a substantially perfect seal between the interior of the valve housing and the conduit, lest coolant leak from the system through the conduit.

Moreover, in order to facilitate the connection of the electrical leads to a plug socket to be mounted on the outer wall of the valve housing, the electrical leads must be longer than the conduit within the crosspiece. When the plug socket is mounted to the outer wall, the excess length of the electrical leads must be pressed into the conduit, thereby resulting in slack in the electrical leads. This slack causes the electrical leads to be susceptible to vibrations, which can result in movement of the supply leads, unwanted noise, or damage to the supply leads-in any event, sub-optimal performance of the system.

OBJECT AND SUMMARY OF THE PRESENT INVENTION

It is accordingly an object of the present invention to improve upon prior-art thermostatic valves, in order to ensure a greater level of manufacturing and operational reliability.

In order to meet this object, the present invention includes a housing of a thermostatic valve for a coolant circuit of an internal combustion engine, which housing is formed at least partially of a plastic material. During the manufacturing process of the housing, electrical leads for supplying electricity to a thermostatic operating element are injected or cast into the housing. Because the electrical leads are embedded in the plastic material, they remain in a fixed position, which eliminates the rubbing or flapping associated with movement of slack electrical leads in a conduit and the resulting noise or damage. Moreover, embedding the electrical leads in the plastic material eliminates the need for an additional seal, since there is no conduit for coolant to leak through. An additional benefit of the present invention is that the plastic material insulates the electrical leads; no additional insulation of the electrical leads, as would be needed in a conduit system, is required. Consequently, the thermostatic valve of the present invention is both operationally reliable and economical to manufacture.

An additional feature of the present invention is the ability to form electrical connectors, such as contact tags or sockets, in the plastic portion of the valve housing. By selecting electrical leads of a shape appropriate for placement within an electrical connector and forming the insulating/connecting portion of the electrical connector as part of the valve housing, a mechanically loadable electrical connector may be formed and placed without any additional work steps, thereby reducing the cost of manufacture.

In accordance with this feature of the present invention, part of the portion of the value housing projects into the interior of the valve and into the coolant flow path to form a support. The electrical leads are embedded within this projection, at the end of which is formed a receptacle that includes an electrical connector and a support upon which is mounted, depending on the particular configuration of the valve, the housing of the thermostatic operating element or the work piston of the thermostatic operating element. Because the electrical leads are sealed within the projection, no further sealing mechanism is necessary despite the placement of the projection within the coolant flow path. Moreover, the embedding of the electrical leads and the forming of the electrical connector and support for the thermostatic operating element may be accomplished simultaneously with and as part of the manufacturing process for the valve housing. In one embodiment of the present invention, the receptacle is formed with a circumferential wall that defines a recess, on the bottom of which the electrical connectors are arranged. The contact pins of the work piston or of the heating element are inserted into the electrical connectors, and the thermostatic operating element is thereby seated on the projection.

In another embodiment of the present invention, the outer wall of the valve housing is formed with a receptacle, in which electrical connectors of the connecting leads are embedded, and which is adapted to receive an external power source. In accordance with this embodiment, a plug receptacle for connecting an external electrical supply to the valve is integrated within the valve housing, thereby eliminating the need for a separate manufacturing step or separate structural components in order to provide a suitable receptacle.

In still another embodiment of the present invention, the electrical leads are formed from substantially planar conducting strips instead of conventional wires. Conducting strips, also known as current bars, provide a number of substantial advantages over conventional wires when used in the system of the present invention. For instance, conducting strips, by virtue of their planar design, are inherently more stable than are conventional round wires when injected into plastic material during the manufacturing process of the housing. The conducting strips are easily bent into a particular configuration in order to achieve a desired shape. Moreover, rotating the strips about their longitudinal axes serves to anchor them firmly within the plastic material.

Further features and advantages of the invention result from the claims and the following description of preferred embodiments of the invention in conjunction with the drawings.

DESCRIPTION OF THE PREFERRED EMBODIMENT

Figure 1:
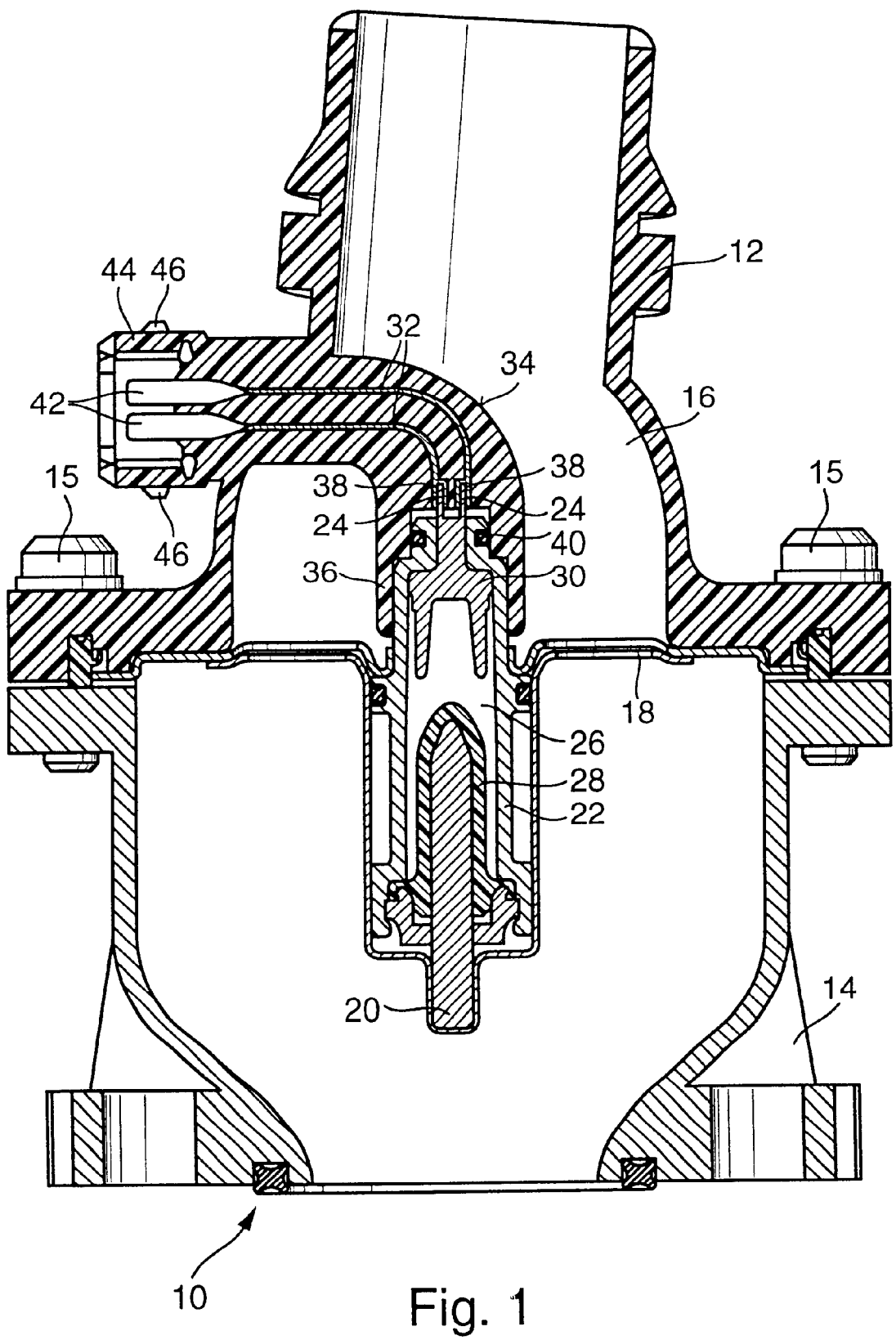
FIG. 1 is a cross-sectional view of a valve housing of a thermostatic valve.

Referring now to FIG. 1, thermostatic valve 10, shown in cross-section, includes a two-part valve housing with cover 12 and base 14. Cover 12 is formed of a plastic material and is connected to bottom part 14 by screws 15. Thermostatic valve 10 is disposed in the coolant circuit of an internal combustion engine and coolant flows through interior 16 of thermostatic valve 10. The flow of coolant through interior 16 is controlled by valve plate 18. A portion of valve plate 18 is disposed adjacent to, and within the drive path of, work piston 20 of thermostatic operating element 22, and the movement of valve plate 18 is therefore controllable by means of work piston 20. Valve plate 18 is pre-tensioned by a spring (not shown) so as to bias it against the drive motion of work piston 20.

Thermostatic operating element 22 includes a housing, preferably made of a metal, such as brass, defining an inner space 26 filled with an expandable material, such as wax. Work piston 20 extends into inner space 26, and membrane 28 is disposed in surrounding relation to work piston 20. When the expandable material is heated, as by coolant flowing through interior 16 or by means of heating element 30 (as discussed below), the expandable material expands, driving work piston 20 downward. Valve plate 18 is likewise driven downward, opening a coolant flow path through thermostatic valve 10. When the expandable material cools and work piston 20 is retracted, the biasing action of the spring restores valve plate 18 upward as allowed by the retraction of work piston 20.

The operation of thermostatic operating element 22 is further controllable by means of heating element 30, which is disposed in inner space 26 (and thereby in contact with the expandable material). The expandable material can be controllably heated, and therefore the movement of work piston 20 can be controlled, by means of heating element 30. Heating element 30 is a resistor disposed in inner space 26 of thermostatic operating element 22 with contact pins 24 running therefrom to the outside of thermostatic operating element 22. The portion of the housing of thermostatic operating element 22 where contact pins 24 exit is preferably sealed by pouring plastic on contact pins 24 after contact pins 24 and heating element 30 have been placed within the housing of thermostatic operating element 22. In this manner, contact pins 24 are mechanically fixed and electrically insulated from the housing of thermostatic operating element 22.

Cover 12 is formed with a projection 34 extending into interior 16 thereof. Projection 34 is formed as a unitary part of cover 12 (and therefore is made of the same material as cover 12). In a preferred embodiment, projection 34 is formed within interior 16 to extend from the wall of cover 12 first transversely to the coolant flow path, then arching toward a central axis of interior 16 so as to form a support on its distal end for thermostatic operating element 22. A pair of conducting strips 32, the placement of which is discussed below, extend from the exterior of cover 12 to the distal end of projection 34 to provide electrical current from the exterior of thermostatic valve 10 to thermostatic operating element 22. Projection 34 is formed on its distal end with a mounting receptacle for thermostatic operating element 22. The mounting receptacle includes circumferential wall 36 defining a recess in which are embedded a pair of electrical connectors 38, which are disposed to receive contact pins 24 of heating element 30 of thermostatic operating element 22.

In order to permit the mounting of thermostatic operating element 22 in interior 16 of thermostatic valve 10 on the distal end of projection 34, the housing of thermostatic operating element 22 is formed so as to engage with circumferential wall 36 and seat in the recess thereof, such that contact pins 24 are received in connectors 38. Proper seating of thermostatic operating element 22 is aided if thermostatic operating element 22 is formed with a circumferential shoulder and circumferential wall 36 is further formed with a matching offset, as seen in FIG. 1. The circumferential shoulder of thermostatic working element 22 is further provided with a cylindrical groove for carrying seal 40, which sealingly engages with an inner surface of circumferential wall 36 so as to protect electrical connectors 38 and contact pins 24 from contact with coolant flowing through interior 16.

Conducting strips 32 are injected into the plastic material of projection 34 during the manufacture of cover 12. Conducting strips 32 are substantially parallel to each other and extend from electrical connectors 38, which are situated on the bottom of the recess of the distal end of projection 34, along the course of and within projection 34. In their further course in the direction of the wall of cover 12, conducting strips 32 are rotated about their longitudinal axis by 90°. Conducting strips 32 are each formed on the end extending through cover 12 with a contact tag 42, which extends to the exterior of cover 12. Cover 12 is further formed, at the point at which contact tags 42 pass through cover 12, with a connector receptacle 44, and contact tags 42 are arranged within connector receptacle 44 on the outside of cover 12. A plug that includes electrical leads to an external power source (not shown) may be inserted into connector receptacle 44. In a preferred embodiment, connector receptacle 44 includes a pair of engagement flanges 46 on its outer circumferential surface. Connector receptacle 44 and projection 34 are formed at the same time as the manufacture of cover 12 by a plastic injection process or other suitable method, and conducting strips 32 with contact tags 42 and electrical connectors 38 are embedded in the plastic material of cover 12 simultaneously with the manufacture of cover 12. As a result, conducting strips 32, contact tags 42, and electrical connectors 38 are fixed within cover 12 and electrically insulated.

Figure 2:
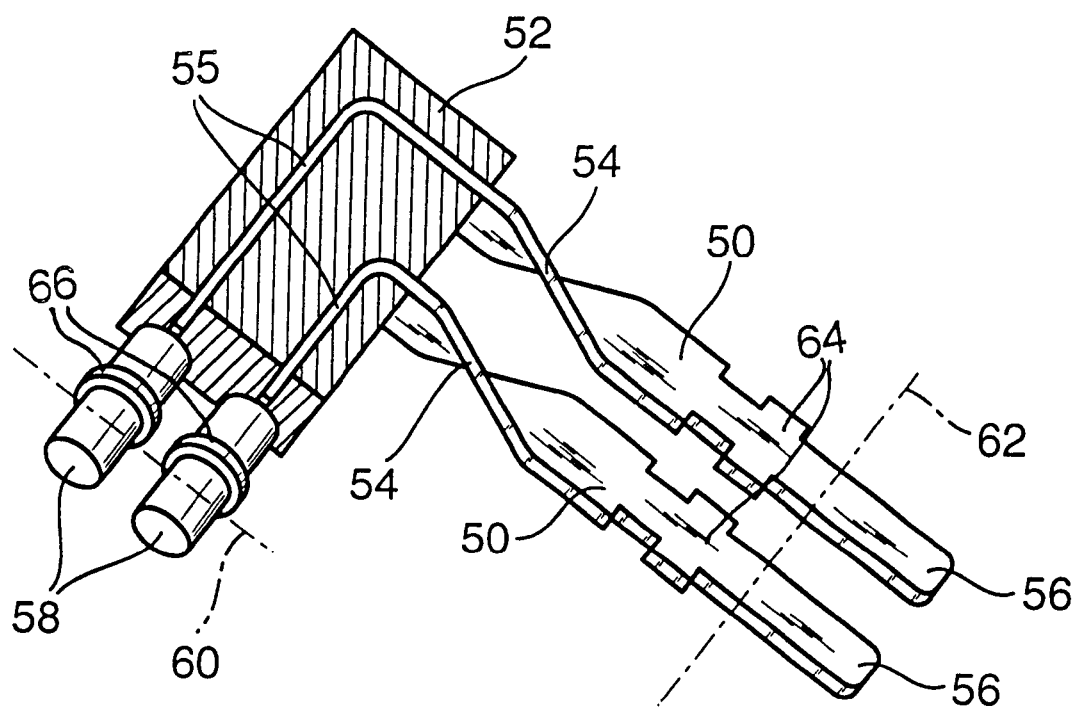
FIG. 2 is a detail view showing electrical leads and connectors in accordance with a preferred embodiment of the present invention.

Referring now to FIG. 2, an embodiment of the present invention is shown in detail. Electrical leads 50 are formed of conducting strips as in the embodiment shown in FIG. 1. Electrical leads 50 are embedded in plastic material 52 that forms, as seen in FIG. 1, a cover 12 of a valve housing for a thermostatic valve 10. In order to show in precise detail the particular configuration of electrical leads 50, only a parallelepipedic section of plastic material 52 is shown, though in this embodiment of the present invention plastic material would extend from the parallelepipedic section through broken lines 60,62. Electrical leads 50 each include a section 54 that is rotated about its longitudinal axis by 90°, which serves to anchor electrical leads 50 in plastic material 52. Electrical leads 50 are bendable about their transverse axes to produce bends 56. The ability of electrical leads 50 to be bent or twisted enable a wide variety of configurations of the thermostatic valve in accordance with the present invention.

Electrical leads 50 are each provided on one end with a contact tag 56 for connecting the thermostatic valve to an external power supply, and on the opposite end with a socket 58 for receiving a contact pin of a heating element for a thermostatic working element (as seen in FIG. 1). In order to embed contact tags 56 and sockets 58 more reliably in plastic material 52, contact tags 56 are provided with tabs 64, and sockets 58 are each provided with a circumferential flange 66. Tabs 64 and circumferential flanges 66 are embedded within plastic material 52, which extends to broken lines 60,62.

Those skilled in the art to which the present invention pertains will note that the thermostatic operating element of the preferred embodiment could very easily be replaced with any of a variety of means for opening and closing the valve, without departing from the scope of the present invention. For instance, the thermostatic operating element could be replaced with a proportional magnet, a DC motor, a linear motor, or a step motor.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

What is claimed is:

1. A valve housing for a valve for controlling a flow of a fluid, comprising:
    an electrically nonconducting cover;
    means for opening and dosing the valve; and
    a pair of electrical leads for providing electrical current to the means for opening and closing the valve, wherein the electrical leads are embedded within the electrically nonconducting cover, and wherein the electrical leads comprise conducting strips and electrical connectors for connecting to the means for opening and closing the valve.

2. The valve housing of claim 1, wherein the valve housing defines a path for the flow.

3. The valve housing of claims 2, wherein the cover comprises a projection extending interiorly to the cover and into the path for the flow.

4. The valve housing of claim 3, wherein the projection comprises a mounting receptacle for mounting the means for opening and closing the valve, wherein the mounting receptacle comprises a pair of electrical connectors.

5. The valve housing of claim 4, wherein each of the electrical connectors is attached to one of the electrical leads.

6. The valve housing of claim 4, wherein the means for opening and closing the valve is mounted on the mounting receptacle and comprises a pair of contact pins which engage with the electrical connectors to provide electrical power to the mean for opening and closing the valve.

7. The valve housing of claim 1, wherein the cover further comprises a connecting receptacle disposed in surrounding relation to an end of each of the electrical leads.

8. The valve housing of claim 7, wherein the connecting receptacle is adapted to engage with a plug comprising an electrical power source.

9. The valve housing of claim 8, wherein the connecting receptacle comprises at least one engagement flange adapted to retain the plug in connecting engagement with the connecting receptacle.

10. A valve system for a coolant circuit of an internal combustion engine, comprising:
    a valve housing defining a flow path for coolant, the valve housing comprising a base and an electrically nonconducting cover;
    a valve disposed within the flow path and operable to open and to close the flow path;
    an electrically controllable operating element disposed wit the flow path and operable to drive the valve; and
    a plurality of electrical leads embedded in the cover and disposed to supply electrical power to the operating element, the electrical leads comprising conducting strips and electrical connectors for connecting to the electrically controllable operating element.

11. The valve system of claim 10, wherein the cover is plastic.

12. The valve system of claim 10, wherein each of the plurality of electrical leads is substantially planar and comprises a portion which has been rotated about its longitudinal axis.

13. The valve system of claim 10, wherein a portion of tire cover projects into the flow path and comprises a receptacle for mounting the operating element.

14. The valve system of claim 13, wherein the plurality of electrical leads are embedded In the portion of the cover which projects into the flow path, and wherein the receptacle comprises a plurality of electrical connectors for connecting the operating element to the electrical leads.

15. The valve system of claim 10, wherein the operating element is a thermostatic operating element.

16. The valve system of claim 15, wherein the thermostatic operating element comprises:
    an element housing defining an inner space, wherein the inner space is filled with an expandable material;
    a heating element for heating the expandable material, wherein the heating element is connected to and receives electrical power through the plurality of electrical leads; and a work piston disposed to drive the valve when the expandable material is heated.

17. The valve system of claim 16, wherein the expandable material as a wax.

18. A method of providing electrical power to a drive element in a valve system for coolant circuit for an internal combustion engine, the method comprising the steps of:

forming a plastic valve housing for the valve system such that the valve housing defines a flow path for coolant and comprises a portion extending into the flow path, the portion extending into the flow path comprising a mounting receptacle for mounting an operating element thereon, the valve housing further comprising a connecting receptacle for connecting the valve system to an electrical power supply;

embedding a plurality of electrical leads within the valve housing, the plurality of electrical leads extending from an exterior of the valve housing through the portion of the valve housing extending into the flow paths the electrical leads comprising conducting strips and electrical connectors for connecting the operating element;

mounting the operating element on the mounting receptacle; and connecting an electrical power supply to the connecting receptacle.

19. The method of claim 18, wherein the electrical leads are substantially planar, the method further comprising the step of:

rotating a segment of each the electrical leads about their respective longitudinal axes.

* * * * *